No. 675,122. Patented May 28, 1901.
W. F. WIDMAYER.
SURVEYING INSTRUMENT.
(Application filed Nov. 13, 1899.)
(No Model.) 2 Sheets—Sheet 2.
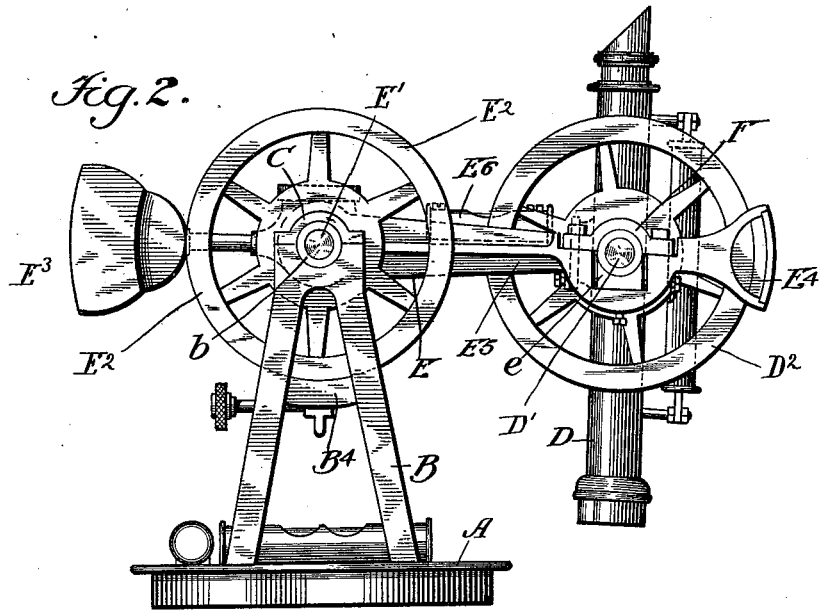
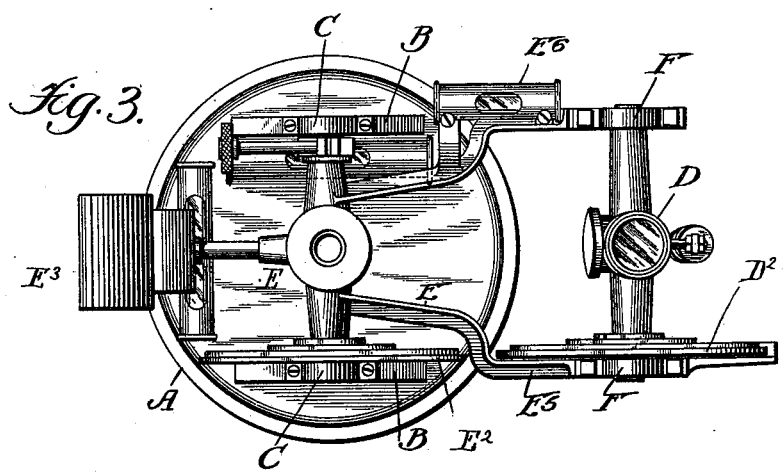
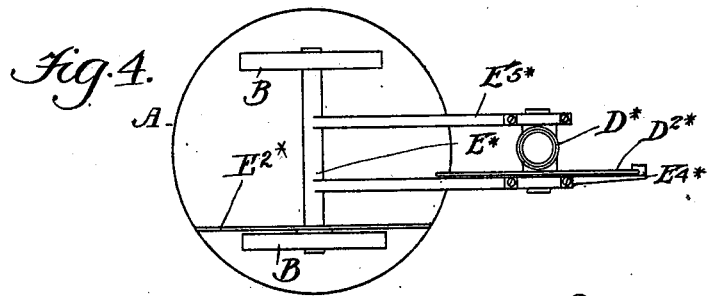

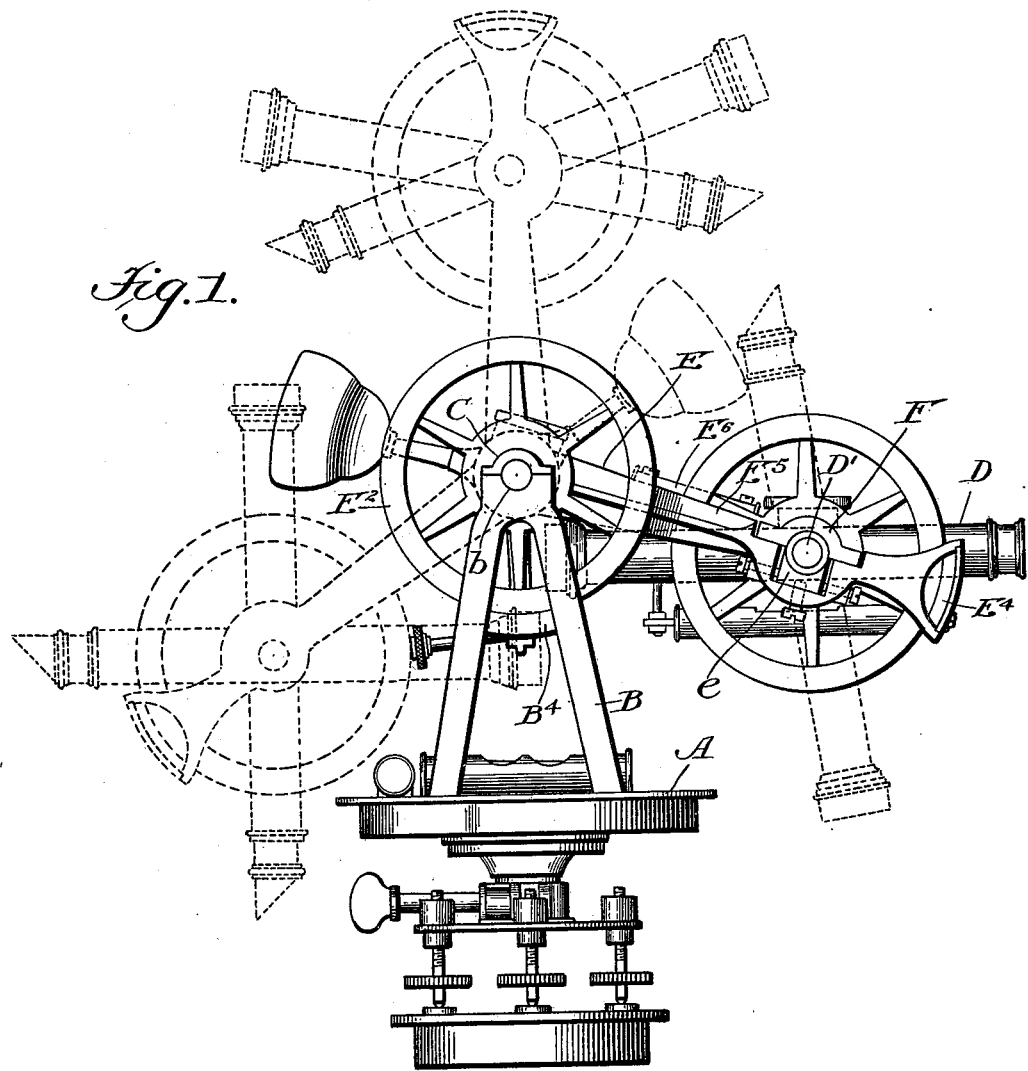

UNITED STATES PATENT OFFICE.

WILLIAM F. WIDMAYER, OF NEW YORK, N. Y.

SURVEYING INSTRUMENT.

SPECIFICATION forming part of Letters Patent No. 675,122, dated May 28, 1901.

Application filed November 13, 1899. Serial No. 736,752. (No model.)

*To all whom it may concern:*

Be it known that I, WILLIAM F. WIDMAYER, of the borough of Manhattan, in the city and State of New York, have invented a certain new and useful Improvement in Surveying Instruments, of which the following is a specification.

The improvement applies to all forms of that class of instruments known as "transits" or "theodolites" having provisions for measuring finely both the horizontal angle and the vertical angle to which the telescope is swung.

The improvement is of advantage for all surveying and engineering purposes, but is intended more especially for mining operations and for precipitous mountain work, where it is necessary to sight directly upward or downward or above or below the range of the ordinary instrument. There have been many efforts made to adapt surveying instruments to these requirements. In one the rigid supports, commonly termed the "standards," are deflected, so as to overhang the side of the instrument so far that the telescope, allowed to turn in the Y's thereof, can range downward perpendicular or even incline obliquely backward a little without the sight being interfered with by the body of the instrument. In another two telescopes are employed, mounted either strictly parallel or with capacity for slight adjustment, the lowermost being centered on trunnions in Y's of standards and serving for ordinary purposes, while the other is firmly connected above at a sufficient distance therefrom to give clear sight downward when both are sufficiently turned. Both these and various other plans are open to serious objections. In my instrument the ordinary supports and the ordinary telescope may be used in all respects in the ordinary manner for ordinary surveying. When it becomes necessary to range vertically, or nearly so, the binders or caps are liberated and the telescope, with its graduated circle and clamp, is carefully lifted out. A peculiar rocking piece is then introduced, which is provided with trunnions exactly matching in the Y's and a graduated circle and clamp (matching the one removed with the telescope) and is capable of turning therein the same as the telescope. This rocker is provided with two divergent arms, which extend to a sufficient distance, provided with proper adjustable bearings for a telescope at their outer ends, each equipped with a binder. The telescope, with its attachments, is then mounted in those bearings of such hinged supporting or rocking piece and is capable both of making a complete revolution in its bearings in the supporting-piece and of being carried bodily in the arc of the circle of which the rocker or supporting-piece forms the radius.

I equip the rocker with a vernier mounted adjustably on one arm thereof in the ordinary manner and on the other arm with a tangent-screw to work with the clamp in unison, and the instrument is then ready to work at any angle, the supporting-piece or rocker being revolved forward or backward or standing upright in a middle position or in any intermediate position, either above or below the Y's of the standards.

I provide the rocker with a counterbalance-weight on an arm extending in the opposite direction, adapted to balance the rocker-arms, the telescope, and its attachments, so it will rest easily in any position, as also with a bubble on one of the arms.

For sighting down a shaft in a mine or when in a mine sighting upward through the shaft or in any nearly-perpendicular direction, the supporting-rocker being adjusted exactly level and clamped, the telescope is operated and the position determined by the graduated circle and vernier with all the ease with which the instrument is worked in the ordinary position. Observations can also be made with the rocker in any other position than horizontal and true results obtained.

A prism eyepiece must be used to allow the observations to be made under certain circumstances.

Used as an ordinary surveying instrument, horizontal angles are read quickly from the horizontal graduated circle. Vertical angles are obtained as follows: Clamp both rocker and telescope horizontal, the eyepiece toward the standards. Loosen clamp to rocker, and read vertical angles direct on vertical circle of rocker without any allowance for eccentricity of the telescope.

The horizontal and vertical distances of any surface-point at top of shaft from any point in the shaft or at the bottom of a mine can be determined trigonometrically with this instrument by the ordinary operation familiar to surveyors without having recourse to linear measurements, and from these data the distance between and the direction of the line connecting the two points can be obtained.

This invention also offers a quick and reliable means of setting up the instrument mathematically correct over a physical point without the aid of a plumb-bob. Level up the instrument and place the rocker and arms in such a position that the physical point can be sighted by the telescope. Clamp both rocker and telescope, and set fine on physical point. Now revolve rocker and telescope, so clamped, around horizonally one hundred and eighty degrees and sight again, and if position is correct the point will again be sighted. Now sight again from two positions at right angles to last one. If point is sighted both times, the instrument is in correct position over physical point. Should any differences be found in the above operations, find the mean of such difference and shift instrument on tripod to compensate for such mean differences respectively, and instrument will be in correct position over physical point.

A solar compass and graduator may be attached to the post on the trunnions of the rocker in the same manner as it is ordinarily to a corresponding post on a telescope. Extra counterpoise should be used for it.

The accompanying drawings form a part of this specification and represent what I consider the best means of carrying out the invention.

Figure 1 is a side elevation, the full lines showing the invention in use adjusted for sighting backward and the dotted lines indicating a number of other adjustments. The graduated wheels are of equal size in practice. Fig. 2 is a corresponding elevation adjusted for sighting down a mine or for setting up over a physical point without the aid of a plumb, and Fig. 3 is a plan view corresponding to Fig. 2. Fig. 4 is a plan view on a smaller scale, showing a modification with rocker-arms closer together.

Similar letters of reference indicate corresponding parts in all the figures where they appear.

Referring to Figs. 1, 2, and 3, A is the plate, B the supports or standards of the instrument, and C C are the ordinary binders. D is the telescope, turning on trunnions $D'$, adapted to be supported in Y's $b\ b$ in the standards, and provided with a graduated wheel. A vernier-scale $B^4$ is arranged in proper relation to the graduated wheel $D^2$ when thus mounted. These parts, as also the parts below, including the tripod and the provisions for indicating horizontal angles, may be all of the ordinary and long-approved construction.

E is my rocker, a partially-revoluble supporting-piece, which is introduced when required. It is provided with trunnions $E'$, exactly corresponding to the trunnions $D'$ of the telescope and similarly carried in the Y's. It is also provided with a graduated wheel $E^2$, exactly corresponding to the wheel $D^2$ on the telescope. Its arms $E^5$ have bearings or Y's $e\ e$, adapted to serve in the same manner as the bearings or Y's $b\ b$, and are correspondingly equipped with binders F to allow the trunnions $D'$ of the telescope to be introduced and removed at will.

$E^4$ is a vernier mounted adjustably on one of the arms $E^5$ in the position required to correctly receive the graduated wheel $D^2$, and $E^6$ is a bubble attached to one of the arms for leveling up the rocker-arms.

The instrument may be used with the rocker in the upright position and in a position for sighting through under the rocker for ordinary surveying, if required, and it may be expedient to thus use it when only a few observations are to be made with the telescope in the ordinary positions. If any considerable amount of horizontal sighting work is to be done, I prefer to remove the rocker E and lay it carefully aside and carry the telescope directly in the Y's in the ordinary position (not necessary to represent) until it shall become necessary to sight again in a vertical or nearly vertical direction, when the rocker shall be again introduced. One mode of operation in ranging out a line with the rocker in use is to first adjust the rocker exactly level and then proceed with the observation, noting only the vertical angle of the wheel $D^2$ by the vernier $E^4$. Another mode of operation is to set the rocker inclining downward or upward to any moderate extent, fixing the inclination thereof by the graduated circle $D^2$, vernier $E^4$, and the rocker. Then determine the inclination of the telescope by the wheel $E^2$ and the vernier $B^4$. Carrying out this same process in another position of the rocker at one hundred and eighty degrees horizontally from the last and from the data obtained in both cases and the constant length of the rocker-arms the location of any point can be obtained.

The proportions allow the telescope to be partially or completely revolved in the rocker at the same time that the rocker is itself revolved or partially revolved. This is a convenience in making frequent and rapid changes for sighting down a mine or precipice to sighting approximately level or from front sight to back sight.

It will be understood that all adjustments necessary to render my instrument serviceable can be easily carried out in the ordinary manner.

Modifications may be made without departing from the principle or sacrificing the advantages of the invention. I can provide a separate telescope $D^*$ and a separate graduated wheel $D^{2*}$ and clamp mounted in a rocker, with vertical circle and clamp, and having arms $E^5$ near together. I effect this by making the arms straight and parallel, the junctions to the shaft being the same distance apart as before and the supplementary bearings for the telescope therein being only the same distance apart. This form of the invention is indicated in Fig. 4.

I claim as my invention—

1. The combination with a telescope and the ordinary bearings of a transit or theodolite, of a detachable rocker adapted to match in the bearings thereof, such rocker having divergent arms carrying bearings near the ends thereof similar to the main bearings and similarly spaced apart adapted to receive a telescope and allow it to be elevated and depressed in the plane of the vertical axis of the instrument, all substantially as herein specified.

2. The combination with the standards of a transit or theodolite of a rocker E having divergent arms $E^5 E^5$ adapted to receive a telescope, the bearings $e$ therefor being similar in all respects to the bearings $b$ in the main standards, and a graduated circle and vernier and level for the rocker and corresponding attachments for the telescope, all adapted to serve substantially as herein specified.

3. The combination with a telescope and the standards of a transit or theodolite, of a rocker E having divergent arms $E^5 E^5$ adapted to receive a telescope, the bearings $e$ therefor being similar in all respects to the bearings $b$ in the main standards, and a graduated circle and vernier and level for the rocker and corresponding attachments for the telescope and a counterbalance $E^3$ on the opposite side of the axis from the telescope-bearings, all arranged to serve substantially as herein specified.

4. The combination with a telescope and the ordinary Y's of a transit or theodolite, of a detachable rocker pivotally mounted in said Y's and having a graduated vertical wheel, and outer bearings pivotally supporting the telescope, substantially as herein specified.

5. The combination with the Y's of a transit or theodolite, of a rocker pivotally mounted in said Y's and having outer bearings or Y's and a telescope pivotally mounted therein so proportioned that the telescope is capable of making a complete revolution around its axis for sighting vertically in any direction in a vertical plane in the plane of the vertical axis of the instrument, substantially as herein specified.

In testimony that I claim the invention above set forth I affix my signature in presence of two witnesses.

WILLIAM F. WIDMAYER.

Witnesses:
WILLIAM PAXTON,
JAMES B. CLAUTICE.